United States Patent
Aliakseyeu et al.

(10) Patent No.: US 11,044,013 B2
(45) Date of Patent: Jun. 22, 2021

(54) SELECTING FROM CONTENT ITEMS ASSOCIATED WITH DIFFERENT LIGHT BEACONS

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Dirk Valentinus René Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 14 days.

(21) Appl. No.: 16/490,622

(22) PCT Filed: Feb. 21, 2018

(86) PCT No.: PCT/EP2018/054223
§ 371 (c)(1),
(2) Date: Sep. 3, 2019

(87) PCT Pub. No.: WO2018/115811
PCT Pub. Date: Sep. 7, 2018

(65) Prior Publication Data
US 2020/0028588 A1    Jan. 23, 2020

(30) Foreign Application Priority Data

Mar. 2, 2017  (EP) .................................... 17158905

(51) Int. Cl.
*H04B 10/116* (2013.01)
*H04W 84/12* (2009.01)
*H05B 45/00* (2020.01)
*H05B 47/19* (2020.01)

(52) U.S. Cl.
CPC ................................ *H04B 10/116* (2013.01)

(58) Field of Classification Search
CPC combination set(s) only.
See application file for complete search history.

(56) References Cited

U.S. PATENT DOCUMENTS

| 8,964,016  | B2  | 2/2015 | Ganick et al. |
| 9,904,825  | B2  | 2/2018 | Van De Sluis et al. |
| 2005/0052621 | A1* | 3/2005 | Allen ................. H04N 9/3197 353/85 |
| 2008/0044188 | A1  | 2/2008 | Kagawa et al. |
| 2011/0128384 | A1* | 6/2011 | Tiscareno .......... H04N 5/23206 348/164 |

(Continued)

FOREIGN PATENT DOCUMENTS

JP    2003323239 A    11/2003

*Primary Examiner* — Omar S Ismail

(57) ABSTRACT

An electronic device (1) is configured to use a sensor, e.g. a camera, to receive data from multiple light beacons (51, 54, 56) via visible light, the data enabling reproduction of content items associated with the light beacons, to select one content item, e.g. a content stream, from the content items associated with the light beacons (e.g. by selecting a content item associated with a selected light beacon (54)) based on one or more properties determined by the electronic device, and to reproduce, e.g. display, the selected content item.

12 Claims, 10 Drawing Sheets

(56) References Cited

U.S. PATENT DOCUMENTS

| | | | |
|---|---|---|---|
| 2014/0186026 A1* | 7/2014 | Oshima | H04N 5/2353 398/25 |
| 2016/0066159 A1 | 3/2016 | Cronin et al. | |
| 2016/0277999 A1 | 9/2016 | Graves et al. | |
| 2017/0033868 A1* | 2/2017 | Hong | H04B 10/116 |

* cited by examiner

SELECTING FROM CONTENT ITEMS ASSOCIATED WITH DIFFERENT LIGHT BEACONS

CROSS-REFERENCE TO PRIOR APPLICATIONS

This application is the U.S. National Phase application under 35 U.S.C. § 371 of International Application No. PCT/EP2018/054223, filed on Feb. 21, 2018, which claims the benefit of European Patent Application No. 17158905.4, filed on Mar. 2, 2017. These applications are hereby incorporated by reference herein.

FIELD OF THE INVENTION

The invention relates to an electronic device for selecting a content item.

The invention further relates to a method of selecting a content item.

The invention also relates to a computer program product enabling a computer system to perform such a method.

BACKGROUND OF THE INVENTION

The provision of location-dependent content inside buildings is becoming increasingly popular and is used in museums and shops, for example. As GPS location determination does not work properly inside buildings, beacons are often used inside buildings instead of GPS to provide location-dependent content. Beacons can also be used outdoors.

US 2016/0277999 A1 discloses a mobile content management system which includes a plurality of distributed beacon transmitters, each configured to continuously broadcast messages including a host URL. Client devices proximate to one or more of the beacons are able to receive the broadcast message and subsequently transmit content requests to the host server located at the host URL. The host server returns an appropriate destination URL whose content may be obtained by the client device and reproduced on the client device. US 2016/0277999 A1 discloses beacons that use high frequency wireless transmission protocols such as Bluetooth and RFID.

A drawback of the mobile content management system of US 2016/0277999 A1 is that the system is not designed to handle situations in which the client device is able to receive messages from multiple beacons at the same time, which may happen when the use of beacons becomes more popular. As a result, the user of the client device may be overloaded with information, especially when the location-dependent content is a content stream, i.e. a steady supply of content items.

SUMMARY OF THE INVENTION

It is a first object of the invention to provide an electronic device, which is able to prevent information overload when signals from multiple beacons are received.

It is a second object of the invention to provide a method, which prevents information overload when signals from multiple beacons are received.

In a first aspect of the invention, the electronic device comprises at least one sensor, an output interface, and at least one processor configured to use said at least one sensor to receive data from a plurality of light beacons via visible light, said data enabling reproduction of content items associated with said plurality of light beacons, to select one content item from said content items associated with said plurality of light beacons based on one or more properties determined by said electronic device, wherein the one or more properties comprise a type of said electronic device; and to use said output interface to reproduce said selected content item. Transmitting data via visible light is commonly referred to as Visible Light Communication (VLC). A content item may comprise a content stream or a single piece of content, for example. A content item may be provided as a content channel, for example.

Said reproducing may include decoding the data to reproduce the content items. The processor may be configured to perform said decoding.

The inventors have recognized that not all content items advertised or transmitted by nearby beacons need to be reproduced and that it is beneficial to have the electronic device automatically select from the content items advertised or transmitted by the different beacons based on one or more properties determined by the electronic device in order to reduce information overload.

Said at least one sensor may comprise a camera and said at least one processor may be configured to select said one content item from said content items associated with said plurality of light beacons by selecting one light beacon from said plurality of light beacons based on properties of said plurality of light beacons determined from an image captured by said camera and selecting a content item associated with said selected light beacon. Since properties of light beacons can be determined with a camera relatively easy, it is beneficial to use these properties to select a light beacon and subsequently select a content item associated with this light beacon.

Said at least one processor may be configured to determine said properties of said plurality of light beacons by determining at least one of distances of positions of said plurality of light beacons in said image to a center of said image, amounts of light pixels belonging to each of said plurality of light beacons, brightness of light pixels belonging to each of said plurality of light beacons, and color of light pixels belonging to each of said plurality of light beacons. These properties of light beacons are especially suitable for facilitating automatic selection of a content item from content items associated with different light beacons.

Said at least one processor may be configured to detect an orientation of said electronic device and to select said one content item from said content items associated with said plurality of light beacons based on said detected orientation of said electronic device. This allows a user to orient the electronic device differently in order to select a different content item.

Said at least one processor may be configured to detect a direction towards which said electronic device is pointing and to select said one content item from said content items associated with said plurality of light beacons based on said detected direction. For example, if someone uses the electronic device in a stadium, theatre or concert hall, it is beneficial to select a content item, e.g. camera view, from a capturing device which is oriented in the same direction as the electronic device and the person using the electronic device.

Said at least one processor may be configured to detect a screen orientation of said electronic device and to select said one content item from said content items associated with said plurality of light beacons based on said detected screen orientation of said electronic device. This allows a content item optimized for landscape mode (e.g. a video stream with a 16:9 aspect ratio) to be selected and reproduced when a mobile phone is held horizontally and a content item optimized for portrait mode (e.g. a text stream) to be selected when the mobile phone is held vertically, for example.

As mentioned, said at least one processor may be configured to select said one content item from said content items associated with said plurality of light beacons based on a type of said electronic device. For example, a video stream may be selected and reproduced if the electronic device is a mobile phone, a text stream may be selected and reproduced if the electronic device is a pair of smart glasses and an audio stream may be selected and reproduced if the electronic device is a headset.

The content items may also comprise a type, or type indicator. Said type indicator may also be decoded during said reproducing mentioned above. Selecting one content item from said content items associated with said plurality of light beacons based on one or more properties determined by said electronic device may then comprise selecting said one content item from said content items associated with said plurality of light beacons based on the type, or type indicator, of the content items. For example, a video stream may be selected and reproduced if the content item is a video (and e.g. electronic device is a mobile phone), a text stream may be selected and reproduced if the content item is text data (and e.g. the electronic device is a pair of smart glasses) and an audio stream may be selected and reproduced if the content item is audio (and e.g. the electronic device is a headset).

Said at least one processor may be configured to select said one content item from said content items associated with said plurality of light beacons based on a user preference. For example, a user may be able to indicate in which types of products (e.g. shoes) the user is interested and content items relating to these types of products may be selected and reproduced instead of content items not relating to these types of products.

Said at least one processor may be configured to select said one content item from said content items associated with said plurality of light beacons based on at least one of a battery level and a current power saving mode of said electronic device. For example, an HD video item may be selected and reproduced when the battery level of the electronic device is full and a text only item may be selected and reproduced when the battery level of the electronic device is low.

In a second aspect of the invention, the method of selecting a content item, e.g. a content stream, comprises receiving on an electronic device data from a plurality of light beacons via visible light, said data enabling reproduction of content items associated with said plurality of light beacons, selecting one content item from said content items associated with said plurality of light beacons based on one or more properties determined by said electronic device, and reproducing said selected content item on said electronic device; wherein selecting one content item from said content items associated with said plurality of light beacons based on one or more properties determined by said electronic device comprises selecting said one content item from said content items associated with said plurality of light beacons based on a type of said electronic device. The method may be implemented in hardware and/or software.

Selecting one content item from said content items associated with said plurality of light beacons based on one or more properties determined by said electronic device may comprise selecting one light beacon from said plurality of light beacons based on properties of said plurality of light beacons determined from an image captured by said camera and selecting a content item associated with said selected light beacon.

Selecting one content item from said content items associated with said plurality of light beacons based on one or more properties determined by said electronic device may comprise detecting an orientation of said electronic device and selecting said one content item from said content items associated with said plurality of light beacons based on said detected orientation of said electronic device.

As mentioned, selecting one content item from said content items associated with said plurality of light beacons based on one or more properties determined by said electronic device may comprise selecting said one content item from said content items associated with said plurality of light beacons based on a type of said electronic device.

Selecting one content item from said content items associated with said plurality of light beacons based on one or more properties determined by said electronic device may comprise selecting said one content item from said content items associated with said plurality of light beacons based on a user preference.

Selecting one content item from said content items associated with said plurality of light beacons based on one or more properties determined by said electronic device may comprise selecting said one content item from said content items associated with said plurality of light beacons based on at least one of a battery level and a current power saving mode of said electronic device.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

Furthermore, in examples, said selecting said one content item from said content items associated with said plurality of light beacons based on a type of said electronic device may comprise selecting an associated light beacon to receive said content item (and corresponding data) from, while e.g. disregarding other light beacons in view of the electronic device. This is advantageous, as a content item may be selected and subsequently only an associated light beacon is used to receive the data from, which reduces power consumption of the device.

Furthermore, in examples, said user preference may comprise a user activity. For example, said selecting said one content item from said content items associated with said plurality of light beacons may be based on a current user activity, which may be detected by a front-view camera, a physiological sensor, a camera, detected data by other devices in the vicinity of said electronic device, etc. For example, when a user is jumping at a stadium watching a game, the electronic device may only select the beacons in view of the electronic device having a Twitter-feed, as during the activity of jumping the user is only able to process simple text information. Another similar example may be provided when the activity of the user is sitting, whereby the electronic device may only select the beacons in view of the electronic device having a video feed, as during the activity of sitting the user is more suited to watch video content.

Alternatively, said selecting said one content item from said content items associated with said plurality of light beacons may be based on a history of user preferences, or alternatively activities. That is, the user preferences may comprise a history of a user, wherein a log is kept of which content items the user has desired to receive. If the user is used to receive audio content, said selecting may comprise always selecting an audio stream from said plurality of light beacons in view of the electronic device.

In other aspects, selecting one content item from said content items associated with said plurality of light beacons based on one or more properties determined by said electronic device may comprise selecting always one type of content item from said content items associated with said plurality of light beacons. For example, having a plurality of light beacons in view of said electronic device, the electronic device may autonomously select a particular type of content item e.g. text feed, image feed, audio feed, video, etc. content items associated with said plurality of light beacons. This facilitates the user using the electronic device, because when having a plurality of light beacons in view, the electronic device is autonomously able to select the right light beacon to receive a content item from.

A non-transitory computer-readable storage medium stores at least one software code portion, the software code portion, when executed or processed by a computer, being configured to perform executable operations comprising: receiving on an electronic device data from a plurality of light beacons via visible light, said data enabling reproduction of content items associated with said plurality of light beacons, selecting one content item from said content items associated with said plurality of light beacons based on one or more properties determined by said electronic device, and reproducing said selected content item on said electronic device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
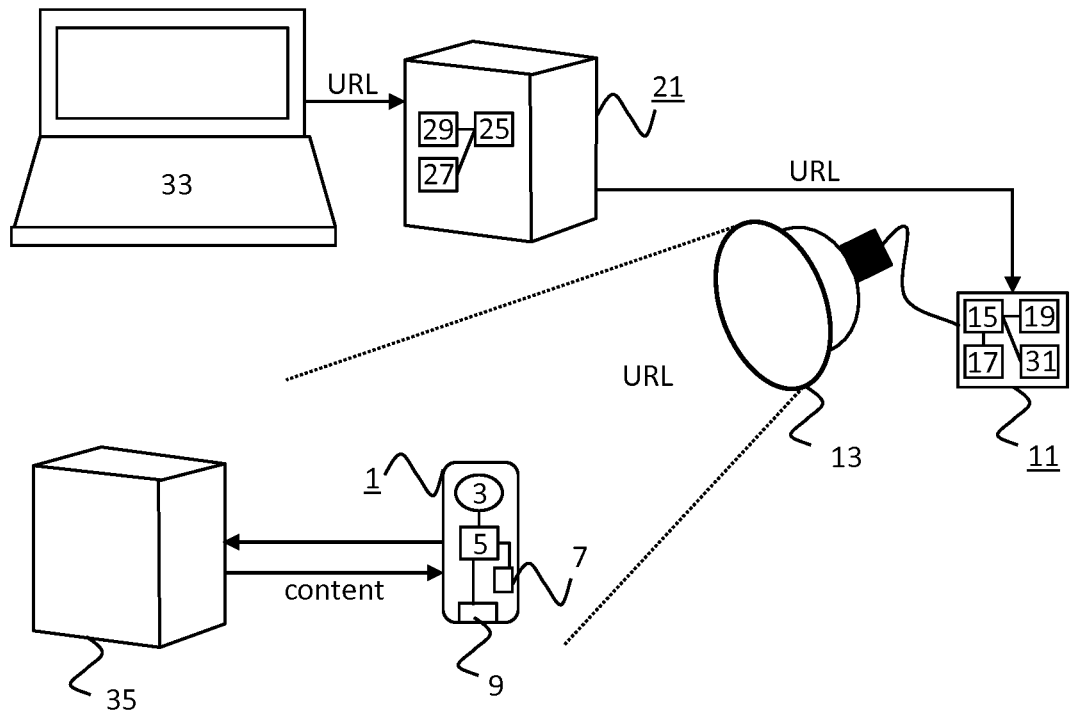
FIGS. 1 and 2 are block diagrams of a first embodiment of the electronic device of the invention.

FIGS. 1 to 6 show embodiments of the electronic device of the invention, a mobile device 1, and a computer 33, a light beacon 11, a first server 21 and a second server 35. The first server 21 comprises a processor 25, a transceiver 29, a power supply 27 and possibly a memory 31. The light beacon 11 comprises a lamp 13, a processor 15, a power supply 17 and possibly a transceiver 19 and a memory 31. The mobile device 1 comprises a processor 5, a sensor 3, a battery 7 and a transceiver 9. In the embodiments shown in FIGS. 1 to 6, the light beacon 11 is the only light beacon from which the mobile device 1 receives data via visible light.

In FIG. 1, the computer 33 is configured to provide an URL pointing to a content item on the second server 35 to the first server 21, the first server 21 is configured to provide the URL to the light beacon 11 and the light beacon 11 is configured to transmit the URL via visible light. The mobile device 1 is configured to receive the URL from the light beacon 11 and to obtain the content item from the second server 35.

In particular, the processor 25 of the first server 21 is configured to use the transceiver 29 receive the URL from the computer 33 and transmit the URL to the light beacon 11. The processor 25 is further configured to receive or determine information which allows it to identify the light beacon 11.

The processor 15 of the light beacon 11 is configured to receive the URL from the first server 21 using the transceiver 19, to store the received URL in memory 31 and to use the lamp 13 to transmit the stored URL via visible light. The processor 5 of the mobile device 1 is configured to use the sensor 3 to receive the URL transmitted by light beacon 11 via visible light and to use the transceiver 9 to transmit a request (e.g. an HTTP request) to the second server 35 identified in the URL and receive the content item from the second server 35 in response to the request. The processor 5 of the mobile device is configured to reproduce the content item, e.g. using a display or an audio output.

Figure 2:
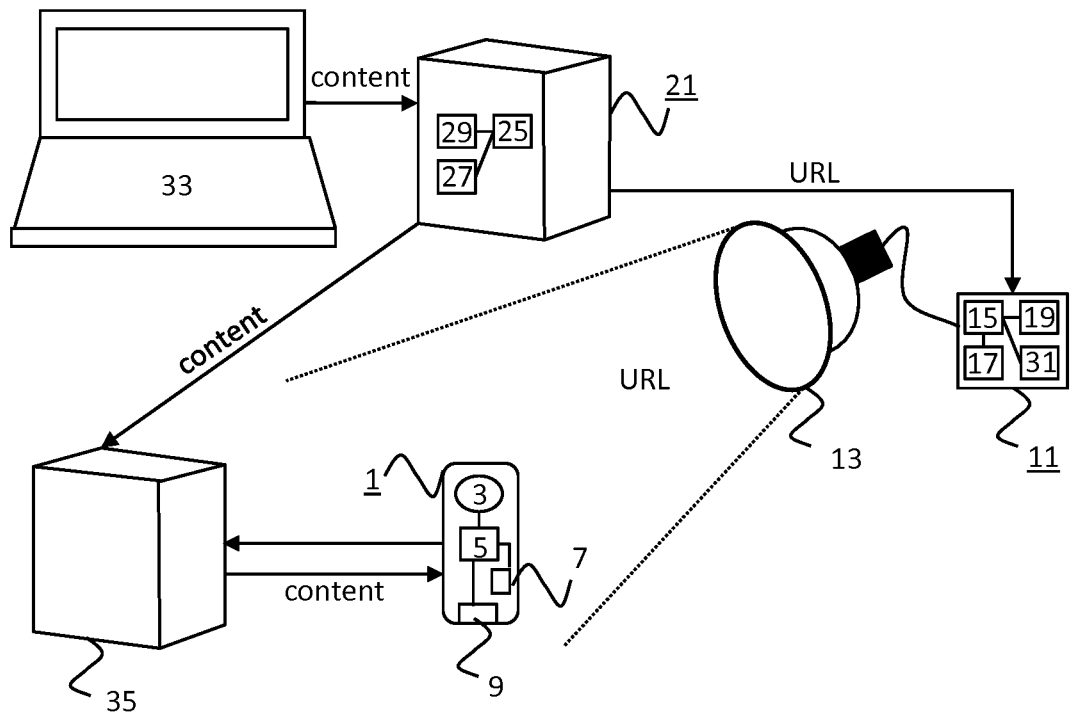

In FIG. 2, the computer 33 is configured to provide a content item to the first server 21, the first server 21 is configured to store the content item on the second server 35 and provide the URL pointing to the content item stored on the second server 35 to the light beacon 11 and the light beacon 11 is configured to transmit the URL via visible light. The mobile device 1 is configured to receive the URL from the light beacon 11 and to obtain the content item from the second server 35.

In particular, the processor 25 of the first server 21 is configured to use transceiver 29 to receive the content item from the computer 33, to instruct the second server 35 to publish the content item and provide the URL of the published content item, to receive the URL to the published content item from the second server 35 and to transmit this URL to the light beacon 11. The processor 25 is further configured to receive or determine information which allows it to identify the light beacon 11. The processor 15 of the light beacon 11 and the processor 5 of the mobile device 1 are configured as described in relation to FIG. 1.

Figure 3:
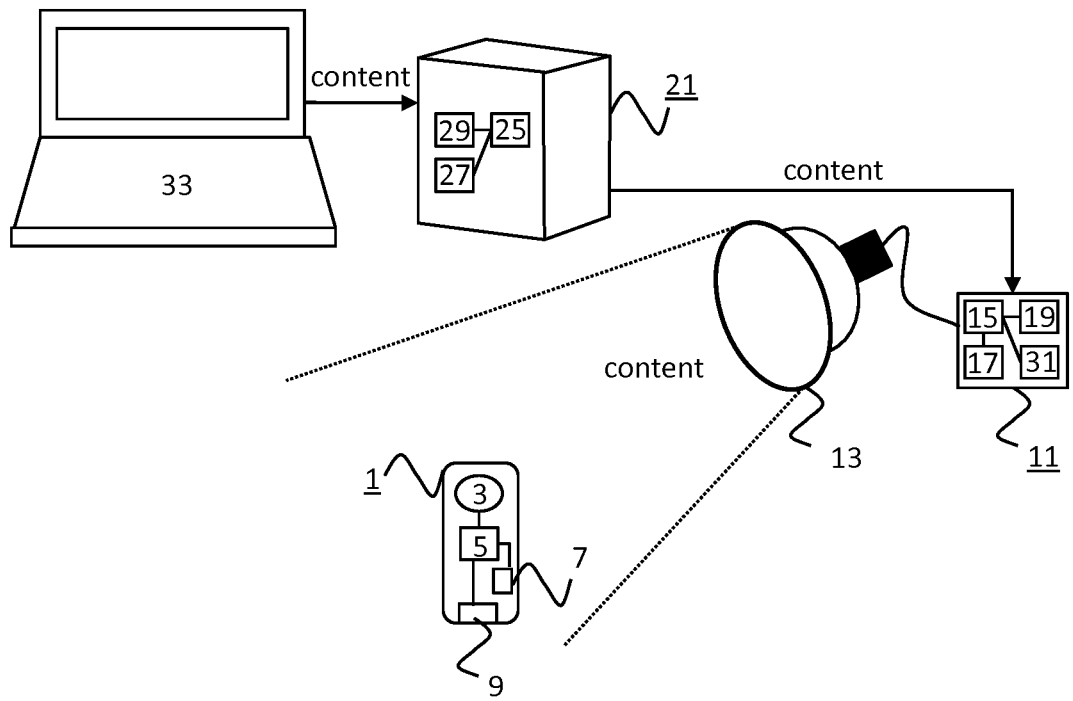
FIG. 3 is a block diagram of a second embodiment of the electronic device.

The URL transmitted by the light beacon 13 might point to a content stream, e.g. a stream of live content, made available at the second server 35. This URL might be temporal in nature, i.e. the URL that leads to the content stream on the second server 35 may be changed to a new URL after a certain period of time, e.g. every 15 minutes, and the processor 25 of the first server 21 may be configured to use the transceiver 29 to transmit each new URL to the light beacon 11. As a result, the mobile device 1 will only be able to continue reproducing the content stream if it receives each new URL from the light beacon 11. This ensures that the user of mobile device 1 can only view the content stream while being nearby the light beacon 11. The processor 25 may be configured to use transceiver 29 to send a request for this change in URL to the second server 35 every certain period of time or the second server 35 may change the URL and provide the new URL to the first server 25 automatically every certain period of time. In FIG. 3, the computer 33 is configured to provide a content item to the first server 21, the first server 21 is configured to provide the content item to the light beacon 11 and the light beacon 11 is configured to transmit the content item via visible light. The mobile device 1 is configured to receive the content item from the light beacon 11.

In particular, the processor 25 of the first server 21 is configured to use the transceiver 29 to receive content item from the computer 33 and transmit the content item to the light beacon 11. The processor 25 is further configured to receive or determine information which allows it to identify the light beacon 11. The processor 15 of the light beacon 11 is configured to receive the content item from the first server 21 using the transceiver 19, to store the received content item in memory 31 and to use the lamp 13 to transmit the stored content item via visible light. The processor 5 of the mobile device 1 is configured to use the sensor 3 to receive the content item transmitted by light beacon 11 via visible light and to reproduce the content item, e.g. using a display or an audio output.

Figure 4:
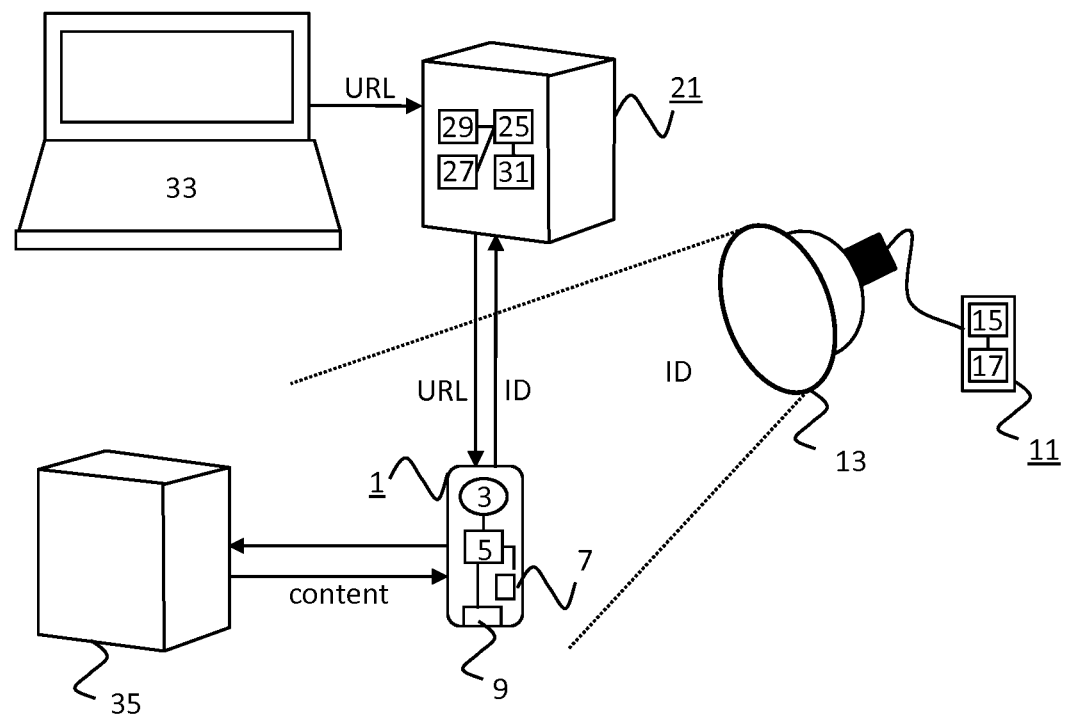
FIGS. 4 and 5 are block diagrams of a third embodiment of the electronic device.

In FIG. 4, the light beacon 11 is configured to transmit an identifier via visible light and is not connected to the first server 21, the computer 33 is configured to provide an URL pointing to a content item on the second server 35 to the first server 21, the first server 21 is configured to associate the URL with the identifier and to provide the URL to the mobile device 1 when the mobile device 1 requests the URL associated with the identifier. The mobile device 1 is configured to receive the identifier from the light beacon 11 via visible light, to obtain the URL associated with the identifier from the first server 21 and to obtain the content item to which the URL points from the second server 35.

In particular, the processor 15 of the light beacon 11 is configured to use the lamp 13 to transmit the identifier. The identifier may be configured when the light beacon 11 is installed, for example. The processor 25 of the first server 21 is configured to use the transceiver 29 to receive the URL from the computer 33 and to receive the identifier of the light beacon 11 from the computer or to receive or determine information which allows it to identify the light beacon 11 and/or the identifier transmitted by the light beacon 11. The processor 25 of the first server 21 is further configured to associate the identifier transmitted by the light beacon 11 with the received URL in the memory 31 of the first server 21. The processor 25 of the first server 21 is also configured to use the transceiver 29 to receive a request to provide an URL associated with an identifier, to lookup the URL associated with identifier in the memory 31 and to provide the URL in response to the request.

The processor 5 of the mobile device 1 is configured to use the sensor 3 to receive the identifier transmitted by the light beacon 11 via visible light and to use the transceiver 9 to transmit a request to the first server 21 to provide the URL associated with this identifier and receive a response comprising the requested URL from the first server 21. The processor 5 is further configured to use the transceiver 9 to transmit a request (e.g. an HTTP request) to the second server 35 identified in the received URL and receive the content item from the second server 35 in response to the request. The processor 5 is also configured to reproduce the content item, e.g. using a display or an audio output.

Figure 5:
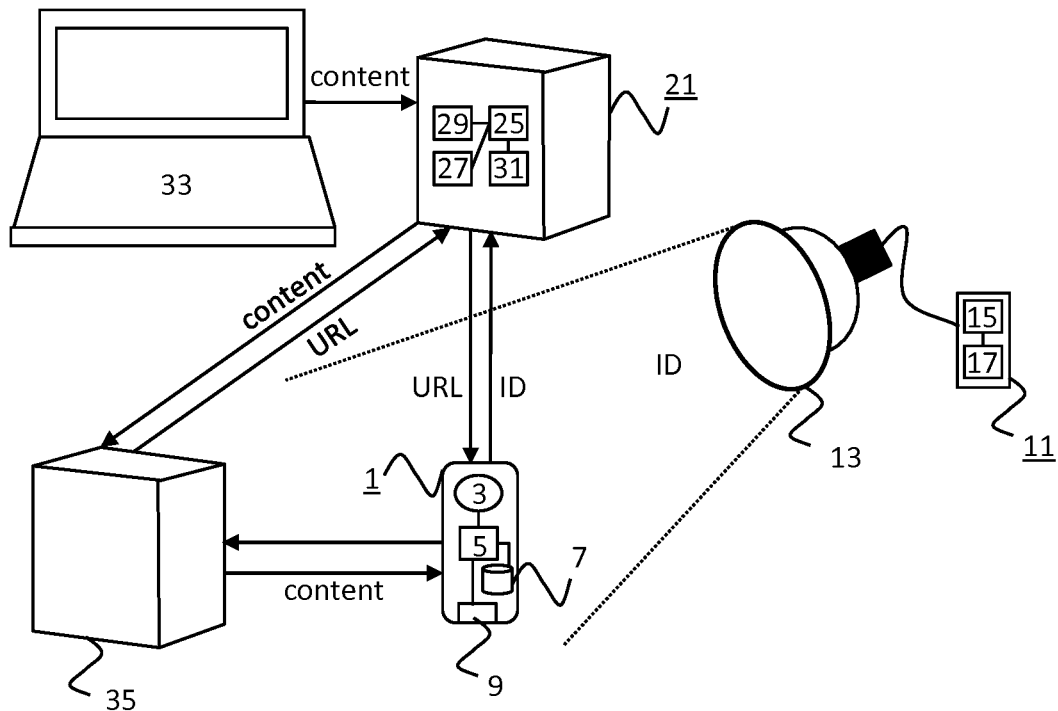

In FIG. 5, the light beacon 11 is configured to transmit an identifier via visible light and is not connected to the first server 21, the computer 33 is configured to provide a content item to the first server 21, and the first server 21 is configured to store the content item on the second server 35, associate the URL pointing to the content item with the identifier and to provide this URL to the mobile device 1 when the mobile device 1 requests the URL associated with the identifier. The mobile device 1 is configured to receive the identifier from the light beacon 11 via visible light, to obtain the URL associated with the identifier from the first server 21 and to obtain the content item to which the URL points from the second server 35.

In particular, the processor 15 of the light beacon 11 is configured to use the lamp 13 to transmit the identifier. The identifier may be configured when the light beacon 11 is installed, for example. The processor 25 of the first server 21 is configured to use the transceiver 29 to receive the content item from the computer 33 and receive the identifier of the light beacon 11 from the computer or to receive or determine information which allows it to identify the light beacon 11 and/or the identifier transmitted by the light beacon 11.

The processor 25 is further configured to use the transceiver 29 to instruct the second server 35 to publish the content item and provide the URL of the published content item, to use the transceiver 29 to receive the URL to the published content from the second server 35, and to associate this URL with the identifier transmitted by the light beacon 11 in the memory 31 of the first server 21. The processor 25 is also configured to use the transceiver 29 to receive a request to provide an URL associated with an identifier, to lookup the URL associated with identifier in the memory 31 and to provide the URL in response to the request. The processor 15 of the light beacon 11 and the processor 5 of the mobile device 1 are configured as described in relation to FIG. 4.

Figure 6:
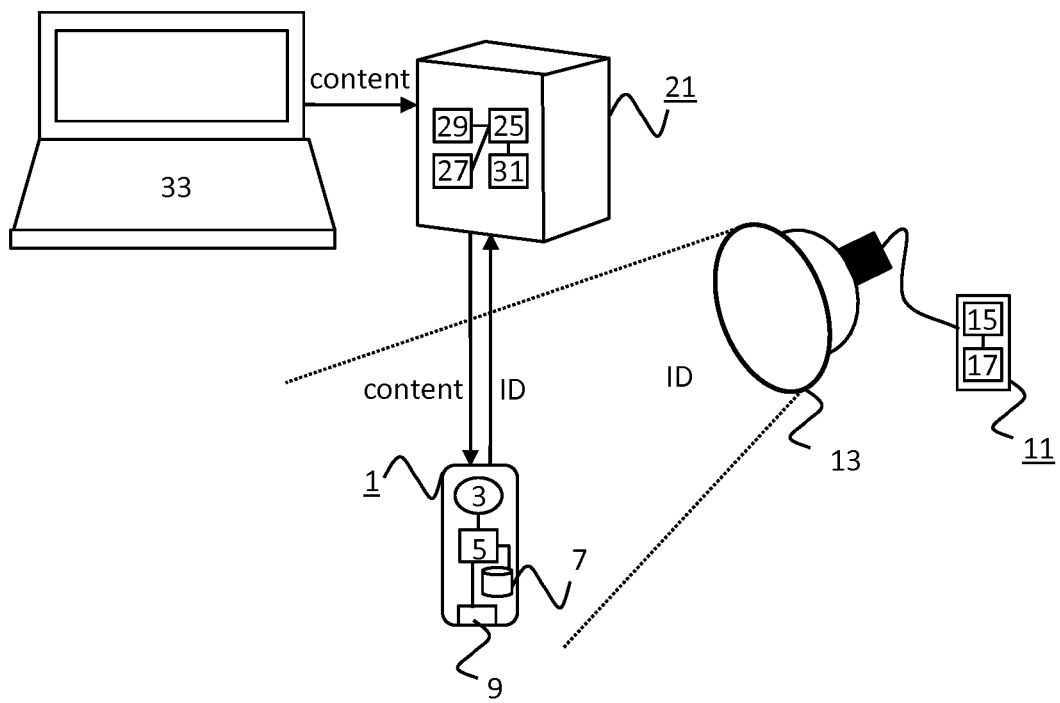
FIG. 6 is a block diagram of a fourth embodiment of the electronic device.

In FIG. 6, the light beacon 11 is configured to transmit an identifier via visible light and is not connected to the first server 21, the computer 33 is configured to provide a content item to the first server 21, and the first server 21 is configured to associate the content item with the identifier and to provide this content item to the mobile device 1 when the mobile device 1 requests the content item associated with the identifier. The mobile device 1 is configured to receive the identifier from the light beacon 11 via visible light and to obtain the content item associated with the identifier from the first server 21.

In particular, the processor 15 of the light beacon 11 is configured to use the lamp 13 to transmit the identifier. The identifier may be configured when the light beacon 11 is installed, for example. The processor 25 of the first server 21 is configured to use the transceiver 29 to receive the content item from the computer 33 and receive the identifier of the light beacon 11 from the computer 33 or to receive or determine information which allows it to identify the light beacon 11 and/or the identifier transmitted by the light beacon 11.

The processor 25 is further configured to associate this content item with the identifier transmitted by the light beacon 11 in the memory 31 of the first server 21. The processor 25 of the first server 21 is also configured to use the transceiver 29 to receive a request to provide a content item associated with an identifier, to lookup the content item associated with identifier in the memory 31 and to provide the content item in response to the request.

The processor 5 of the mobile device 1 is configured to use the sensor 3 to receive the identifier transmitted by the light beacon 11 via visible light and to use the transceiver 9 to transmit a request to provide the content item associated with this identifier to the first server 21 and receive a response comprising the requested content item from the first server 21. The processor 5 is also configured to reproduce the content item, e.g. using a display or an audio output.

The computer 33 may comprise a laptop, personal computer, mobile phone, tablet, video camera device or photo camera device, for example. The computer 33 may comprise an input device, e.g. a keyboard or touch screen, for entering an URL or for selecting a content item and a display for verifying the entered URL or selected content item, for example. The content item may comprise video, one or more still images, audio and/or text, for example. In an embodiment, the entered URL points to a content item stored on the computer 33 or to a live content item being captured by the computer 33.

The processor 25 of the first server 21 may be a general-purpose processor, e.g. from Intel or AMD, or an application-specific processor. The processor 25 of the first server 21 may run a Windows-based or Unix-based operating system, for example. In the embodiment shown in FIGS. 1 to 6, the first server 21 comprises one processor 25. In an alternative embodiment, the first server 21 comprises multiple processors. The first server 21 may comprise other components typical for a server. The second server 35 may comprise similar hardware as the first server 21. The first server 21 and/or the second server 35 may run a web server.

The memory 31 may comprise solid state memory, a hard disk and/or an optical disc, for example. The lamp 13 of the light beacon 11 comprises one or more light sources, e.g. LEDs. The processor 15 of the mobile device 1 may be a general-purpose processor, e.g. from ARM, or an application-specific processor. The lamp 13 and the processor 15 may be incorporated in a single device or may be incorporated into multiple devices connected by a wire or connected wirelessly. In the embodiment shown in FIGS. 1 to 6, the light beacon comprises one processor 15. In an alternative embodiment, the light beacon 11 comprises multiple processors. The light beacon 11 may comprise other components typical for a beacon.

The mobile device 1 may comprise a laptop, mobile phone, tablet, video camera device, photo camera device or pair of augmented reality glasses, for example. The sensor 3 may comprise a camera and/or a light sensor, for example. The paper "Luxapose: Indoor Positioning with Mobile Phones and Visible Light" by Kuo et al., published on pages 447-458 of the MobiCom '14 Proceedings of the 20th annual international conference on Mobile computing and networking in September 2014, discloses the use of conventional smartphone hardware for receiving data from light beacons via visible light. The method involves determining the location of a camera-equipped smartphone with the help of LED luminaires that transmit identifiers and/or locations encoded in human-imperceptible optical pulses. The camera-equipped smartphone is an unmodified smartphone whose exposure and ISO settings are changed in order to detect and decode the transmitted visible light data. The processor 5 of the mobile device 1 may be a general-purpose processor, e.g. from ARM or Qualcomm, or an application-specific processor. The processor 5 of the mobile device 1 may run an iOS, Windows or Android operating system for example. In the embodiment shown in FIGS. 1 to 6, the mobile device 1 comprises one processor 5. In an alternative embodiment, the mobile device 1 comprises multiple processors. The mobile device 1 may comprise other components typical for a mobile device.

In the embodiment shown in FIGS. 1 to 6, receiver and transmitter are combined in a single transceiver (transceivers 9, 19 and 29). In an alternative embodiment, the receiver and transmitter may be separate components. Instead of a single transceiver, multiple transceivers may be used. In an alternative embodiment, the light beacon 11 comprises only a receiver instead of a transceiver 19. One or more of the following communication technologies may be supported, for example, by the transceivers: Ethernet (IEEE 802.3) Wi-Fi (IEEE 802.11), Bluetooth, ZigBee, GPRS, EDGE, UMTS, LTE, 5G. The invention may be implemented using a computer program running on one or more processors.

Since it may happen that the mobile device 1 is in the vicinity of a plurality of lights beacons, the processor 5 of the mobile device 1 is configured to use the sensor 3 to receive data from a plurality of light beacons via visible light. The data enables reproduction of content items associated with the plurality of light beacons. The processor 5 is further configured to select one content item from the content items associated with the plurality of light beacons based on one or more properties determined by the mobile device 1 and to use an output interface to reproduce the selected content item.

In an embodiment, the sensor 3 comprises a camera and the processor 5 is configured to select the one content item from the content items associated with the plurality of light beacons by selecting one light beacon from the plurality of light beacons based on properties of the plurality of light beacons determined from an image captured by the camera and selecting a content item associated with the selected light beacon. For example, the processor 5 may be configured to determine the properties of the plurality of light beacons by determining to determine amounts of light pixels belonging to each of the plurality of light beacons. This is illustrated with the help of FIGS. 7 and 8.

Figure 7:
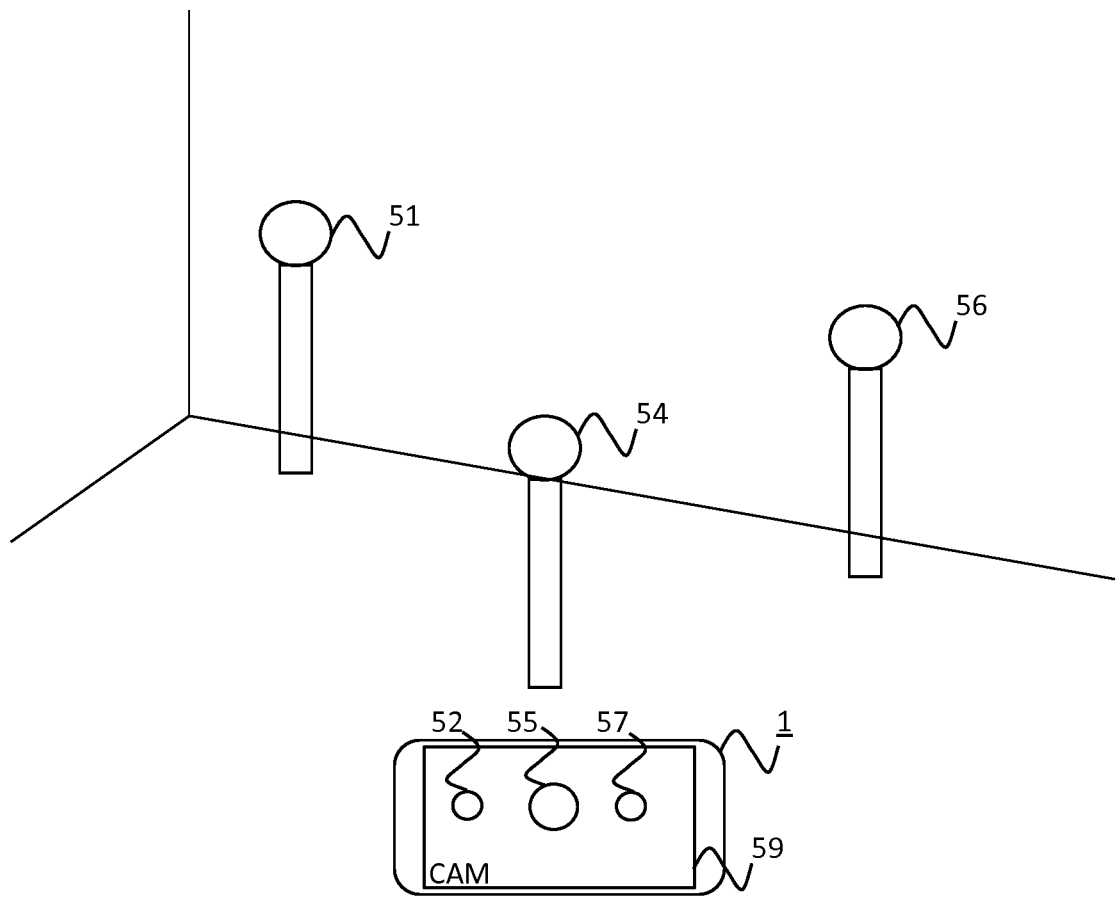
FIGS. 7 and 8 illustrate the selection of a light beacon in an embodiment of the electronic device of the invention.

In FIG. 7, three identical light beacons 51, 54 and 56 are shown. Light beacon 54 is closest to the mobile device 1. Light beacons 51 and 56 are located at the same distance of the mobile device 1. Light beacons 51, 54, 56 are represented as pixel areas 52, 55 and 57 on the screen 59 of the mobile device 1, which displays the camera view. The pixel areas 52, 55 and 57 comprises adjacent pixels with a brightness value exceeding a threshold value. As the light beacons 51, 54 and 56 are identical, the size of the pixel areas 52, 55 and 57 is determined by the distance between the respective light beacons 51, 54 and 56 and the mobile device 1. Since the pixel area 55 is the largest of the three pixel areas, the light beacon 54 is selected. A content item associated with the light beacon 54 is selected.

Figure 8:
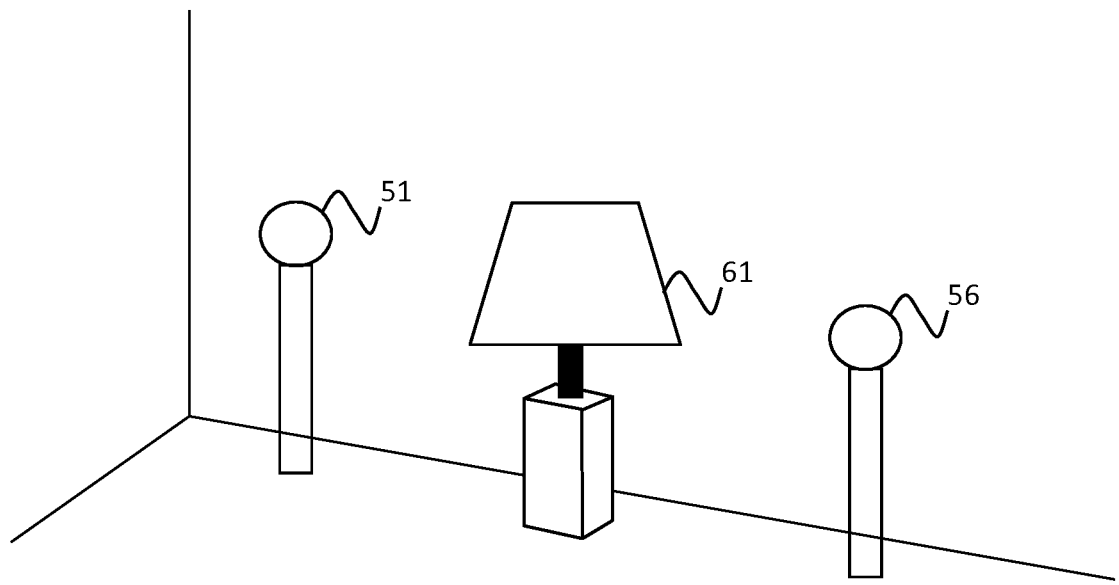
Figure 8:
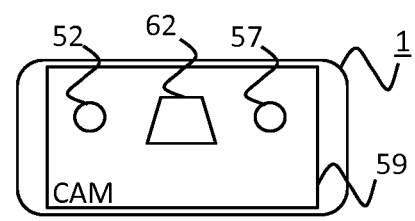

In FIG. 8, light beacon 54 has been replaced with a larger light beacon 61. Light beacons 51, 56 and 61 are located at the same distance of the mobile device 1. Light beacon 61 is represented as pixel area 62 on the screen 59 of the mobile device 1. Since the pixel area 62 is the largest of the three pixel areas, the light beacon 61 is selected. A content item associated with the light beacon 61 is selected.

Alternatively or additionally, the processor 5 may be configured to determine the properties of the plurality of light beacons by determining at least one of distances of positions of the plurality of light beacons in the image to a center of the image, brightness of light pixels belonging to each of the plurality of light beacons, and color of light pixels belonging to each of the plurality of light beacons.

Figure 9:
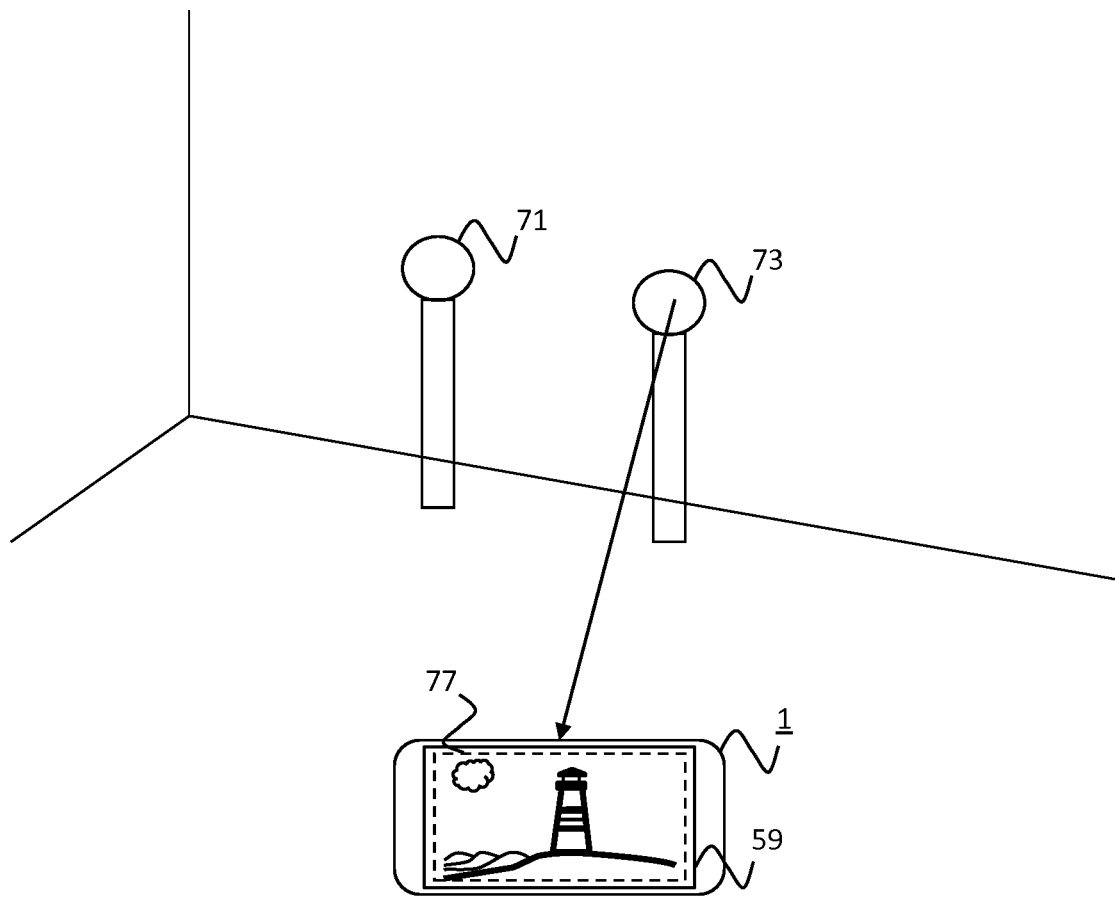
FIGS. 9 and 10 illustrate the selection of a light beacon in a further embodiment of the electronic device.
Figure 10:
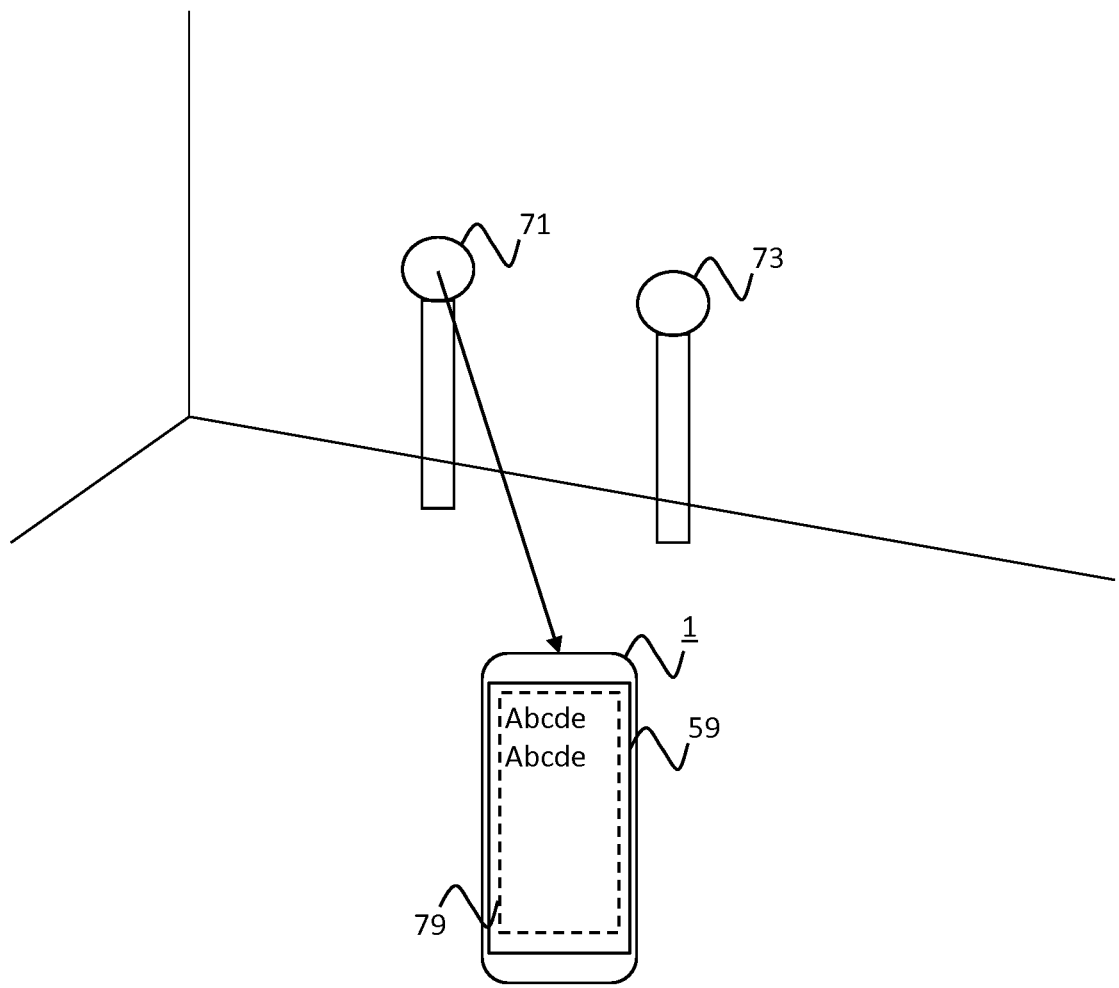

In the same embodiment or in another embodiment, the processor 5 is configured to detect a screen orientation of the mobile device 1 and to select the one content item from the content items associated with the plurality of light beacons based on the detected screen orientation of the electronic device. This is illustrated with the help of FIGS. 9 and 10. In FIGS. 9 and 10, two identical light beacons 71 and 73 are shown. Light beacon 71 has been associated with a vertical screen orientation and light beacon 73 has been associated with a horizontal screen orientation. This association may be stored on the first server 21 or may be transmitted by the light beacons 71 and 73 via visible light.

In FIG. 9, the mobile device 1 is held horizontally and receives data from both light beacons 71 and 73 via visible light. Since light beacon 73 has been associated with a horizontal screen orientation, the light beacon 73 is selected. The content item associated with the light beacon 73 is selected. This content item, a video channel/stream 77, is displayed on screen 59 of the mobile device 1. In FIG. 10, the mobile device 1 is held vertically and receives data from both light beacons 71 and 73 via visible light. Since light beacon 71 has been associated with a vertical screen orientation, the light beacon 71 is selected. The content item associated with the light beacon 71 is selected. This content item, a text channel/stream 79, is displayed on screen 59 of the mobile device 1.

In the same embodiment or in another embodiment, the processor 5 is configured to detect a direction towards which the mobile device 1 is pointing and to select the one content item from the content items associated with the plurality of light beacons based on the detected direction. The light beacons may be part of façade lighting of stadiums and theatres, e.g. emitting links to event-related content (twitter or video items) intended for persons outside the stadium or theatre. The video items may be real time but limited to a certain short duration (after which the user will not have access any more to this particular item), or may repeat the same video content (e.g. teaser/commercial). Some or all of the content items may also be intended for persons inside the stadium or theatre.

Figure 11:
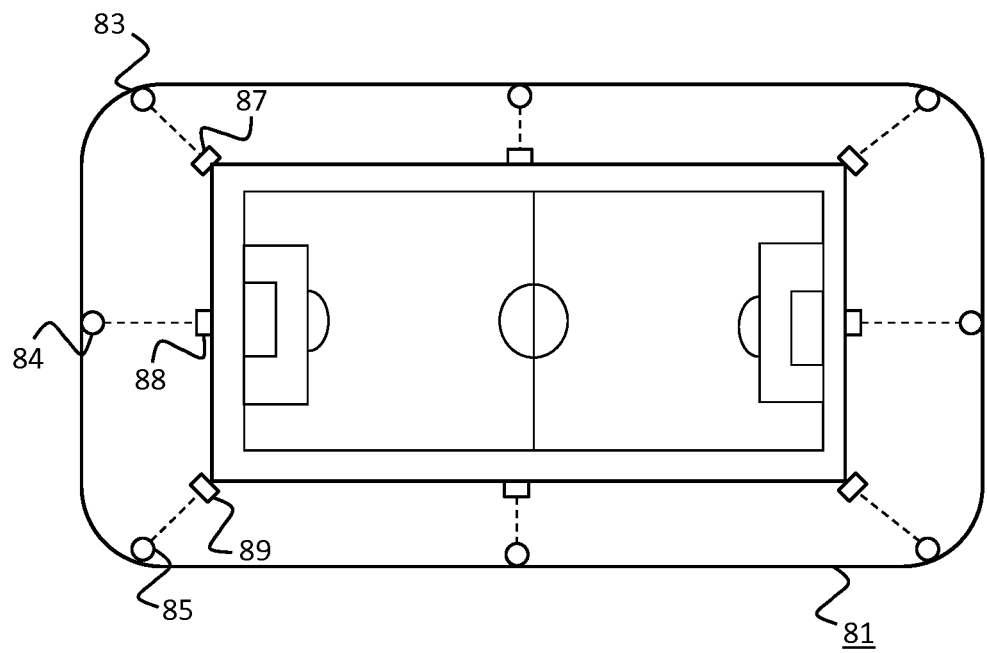
FIG. 11 depicts a stadium with light beacons and capture devices to illustrate selection of a light beacon in another embodiment of the electronic device.

This embodiment is illustrated with the help of FIG. 11. In FIG. 11, a soccer stadium 81 is depicted. Light beacons and cameras are placed throughout the stadium 81. Light beacons 83 to 85 and cameras 87 to 89 are located on the left side of the stadium 81. Each light beacon is associated with the nearest camera, i.e. light beacon 83 is associated with camera 87, light beacon 84 is associated with camera 88 and light beacon 85 is associated with camera 89. In this embodiment, the mobile device 1 does not select the light beacon which is nearest to it, but the light beacon which is associated with the camera that is pointing in a similar direction as the mobile device 1. This results in the selection of a content stream that is captured at a similar angle as the angle of view of the user of the mobile device 1.

In the same embodiment or in another embodiment, the processor 5 is configured to select the one content item from the content items associated with the plurality of light beacons based on a type of the mobile device 1, a user preference, a battery level and/or a current power saving mode of the mobile device 1. For example, shop window light beacons may emit identifiers representing a link to video advertisements related to presented products and selection of the one content item may depend on a user preference for certain types of products, e.g. shoes. The user preference may be stored in the mobile device 1 or retrieved from a server by the mobile device 1, for example. The selection may also depend on other variables, e.g. the orientation of the mobile device 1.

Figure 12:
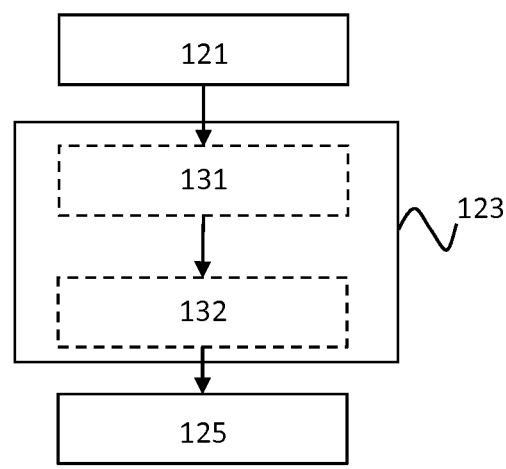
FIG. 12 is a flow diagram of a first embodiment of the method of the invention.

In a first embodiment of the method, see FIG. 12, a step 121 comprises receiving on an electronic device data from a plurality of light beacons via visible light. The data enables reproduction of content items associated with the plurality of light beacons. A step 123 comprises selecting one content item from the content items associated with the plurality of light beacons based on one or more properties determined by the electronic device. A step 125 comprises reproducing the selected content item on the electronic device.

In this first embodiment, step 123 comprises a step 131 of selecting one light beacon from the plurality of light beacons based on properties of the plurality of light beacons determined from an image captured by the camera and a step 132 of selecting a content item associated with the selected light beacon.

Figure 13:
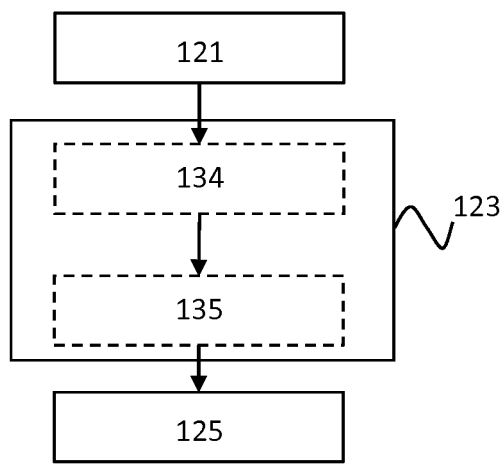
FIG. 13 is a flow diagram of a second embodiment of the method.

In a second embodiment of the method, see FIG. 13, step 123 of FIG. 12 comprises a step 134 of detecting an orientation of the electronic device and a step 135 of selecting the one content item from the content items associated with the plurality of light beacons based on the detected orientation of the electronic device.

Figure 14:
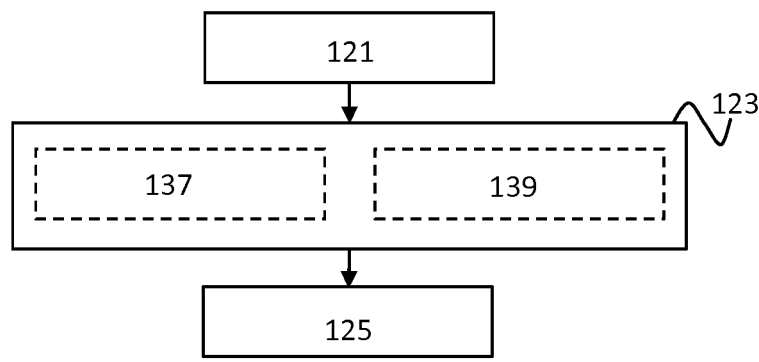
FIG. 14 is a flow diagram of a third embodiment of the method.

In a third embodiment of the method, see FIG. 14, step 123 of FIG. 12 comprises a step 137 and/or a step 139. Step 137 comprises selecting the one content item from the content items associated with the plurality of light beacons based on a type of the electronic device. Step 139 comprises selecting the one content item from the content items associated with the plurality of light beacons based on a user preference. Two or more of the first, second and third embodiments may be combined in a single embodiment.

Figure 15:
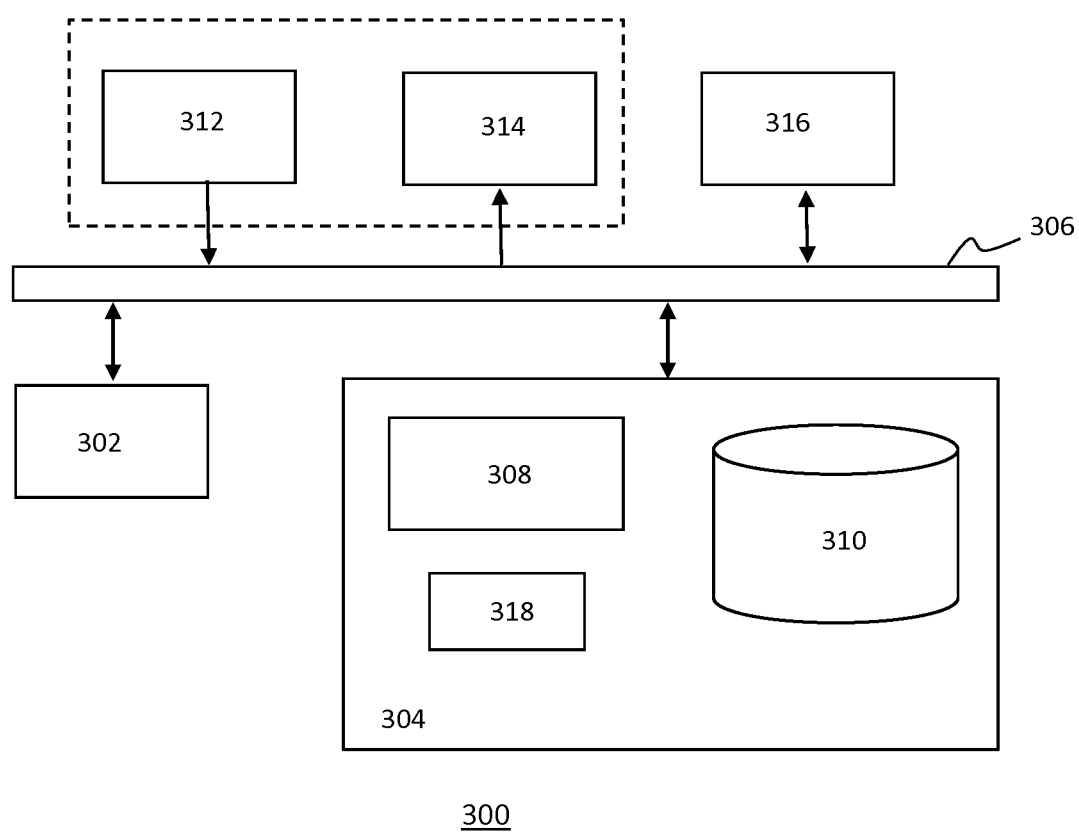
FIG. 15 is a block diagram of an exemplary data processing system for performing the method of the invention.

FIG. 15 depicts a block diagram illustrating an exemplary data processing system that may perform the method as described with reference to FIGS. 12 to 14.

As shown in FIG. 15, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 15 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 15, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 15) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device, comprising:
at least one sensor comprising a camera;
an output interface; and
at least one processor configured:
to use said at least one sensor to receive data from a plurality of light beacons via visible light, said data enabling reproduction of content items associated with said plurality of light beacons,
to select one content item from said content items associated with said plurality of light beacons based on one or more properties determined by said electronic device by: selecting one light beacon from said plurality of light beacons based on properties of said plurality of light beacons determined from an image captured by said camera, and selecting a content item associated with said selected light beacon, wherein the one or more properties comprise a type of said electronic device; and
to use said output interface to reproduce said selected content item,
wherein said at least one processor is configured to determine said properties of said plurality of light beacons by determining at least one of distances of positions of said plurality of light beacons in said image to a center of said image, amounts of light pixels belonging to each of said plurality of light beacons, brightness of light pixels belonging to each of said plurality of light beacons, and color of light pixels belonging to each of said plurality of light beacons.

2. An electronic device as claimed in claim 1, wherein said at least one processor is configured to detect an orientation of said electronic device and to select said one content item from said content items associated with said plurality of light beacons based on said detected orientation of said electronic device.

3. An electronic device as claimed in claim 2, wherein said at least one processor is configured to detect a direction towards which said electronic device is pointing and to select said one content item from said content items associated with said plurality of light beacons based on said detected direction.

4. An electronic device as claimed in claim 2, wherein said at least one processor is configured to detect a screen orientation of said electronic device and to select said one content item from said content items associated with said plurality of light beacons based on said detected screen orientation of said electronic device.

5. An electronic device as claimed in claim 1, wherein said at least one processor is configured to select said one content item from said content items associated with said plurality of light beacons based on a battery level of said electronic device.

6. An electronic device as claimed in claim 1, wherein said at least one processor is configured to select said one content item from said content items associated with said plurality of light beacons based on a user preference.

7. An electronic device as claimed in claim 1, wherein said at least one processor is configured to select said one content item from said content items associated with said plurality of light beacons based on a current power saving mode of said electronic device.

8. A method of selecting a content item, comprising:
receiving on an electronic device comprising at least one sensor comprising a camera, data from a plurality of light beacons via visible light, data enabling reproduction of content items associated with said plurality of light beacons;
selecting one content item from said content items associated with said plurality of light beacons based on one or more properties determined by said electronic device by: selecting one light beacon from said plurality of light beacons based on properties of said plurality of light beacons determined from an image captured by said camera, and selecting a content item associated with said selected light beacon; and
reproducing said selected content item on said electronic device;
wherein selecting one content item from said content items associated with said plurality of light beacons based on one or more properties determined by said electronic device comprises selecting said one content item from said content items associated with said plurality of light beacons based on a type of said electronic device, and
wherein said properties of said plurality of light beacons are determined by determining at least one of distances of positions of said plurality of light beacons in said image to a center of said image, amounts of light pixels belonging to each of said plurality of light beacons, brightness of light pixels belonging to each of said plurality of light beacons, and color of light pixels belonging to each of said plurality of light beacons.

9. A method as claimed in claim 8, wherein selecting one content item from said content items associated with said plurality of light beacons based on one or more properties determined by said electronic device comprises detecting an orientation of said electronic device and selecting said one content item from said content items associated with said plurality of light beacons based on said detected orientation of said electronic device.

10. A method as claimed in claim 8, wherein selecting one content item from said content items associated with said plurality of light beacons based on one or more properties determined by said electronic device comprises selecting said one content item from said content items associated with said plurality of light beacons based on at least one of a battery level and a current power saving mode of said electronic device.

11. A method as claimed in claim 8, wherein selecting one content item from said content items associated with said plurality of light beacons based on one or more properties determined by said electronic device comprises selecting said one content item from said content items associated with said plurality of light beacons based on a user preference.

12. A non-transitory computer readable medium comprising computer code, the computer code, when executed on one or more processors performs the method of claim 8.

* * * * *